March 10, 1970 S. C. HETH Re. 26,816

AIR-SUPPORTED LAWN MOWER

Original Filed July 29, 1964

INVENTOR:
SHERMAN C. HETH

BY: Arthur J. Hanomann
ATTORNEY

United States Patent Office

Re. 26,816
Reissued Mar. 10, 1970

26,816
AIR-SUPPORTED LAWN MOWER

Sherman C. Heth, Racine, Wis., assignor to Jacobsen Manufacturing Co., Racine, Wis., a corporation of Wisconsin Original No. 3,293,836, dated Dec. 27, 1966, Ser. No. 385,928, July 29, 1964. Application for reissue Jan. 5, 1968, Ser. No. 702,141
Int. Cl. A01d *35/26*
U.S. Cl. 56—25.4 8 Claims

Matter enclosed in heavy brackets [ ] appears in the original patent but forms no part of this reissue specification; matter printed in italics indicates the additions made by reissue.

*ABSTRACT OF THE DISCLOSURE*

*An air-supported lawn mower having a housing with an air inlet opening in the top. An engine with a shaft extending into the housing and having grass-cutting blades and air-blowing blades at the lower end of the shaft. The air-blowing blades are arranged with the housing to direct air through the inlet opening and have the air baffled by the housing and downwardly to the open bottom of the housing, for air supporting the mower while it is operating and cutting grass.*

This invention relates to an air-supported type of lawn mower.

It is a general object of this invention to provide an improved air-supported type of lawn mower. This invention is particularly adaptable to a rotary type lawn mower which is air-supported and therefore does not require ground wheels and axles and other parts which are normally utilized for framing of a mower and supporting the mower on the ground by means of ground wheels.

A more specific object of this invention is to provide an air-supported lawn mower wherein the air pressure is created by an improved means, and wherein the air pressure is conserved and employed in recycling of the air so that a more efficient mower will be provided, and the air will not be blasted out from the mower housing to create the usual dust and like problems of the escaping air in ground effect machines.

Still another more specific object of this invention is to provide an air-supported lawn mower wherein the mower utilizes a rotary cutting member and the air blades are mounted directly on the cutting member so that a separate air blower will not be required.

Still another object of this invention is to provide an air-supported lawn mower wherein the mower has a cutting rotor with cutting blades which are pitched in a manner to create an upward air flow in the area of the blades so that the grass can be disposed in a most desirable upstanding position and it will not be disturbed by the air pressure utilized to support the entire mower.

Still a further object of this invention is to provide an air-supported lawn mower with a cutting disc which combines both the grass-cutting blades and the air-blowing blades and with the disc being disposed in a position lower than the mower housing so that the disc itself will provide a surface for receiving the air pressure and thus a smaller space is available and only the smaller space need be pressurized to support the mower compared to the larger space between the ground and the mower housing.

Other objects and advantages become apparent upon reading the following description in light of the accompanying drawings, wherein.

Figure 2:
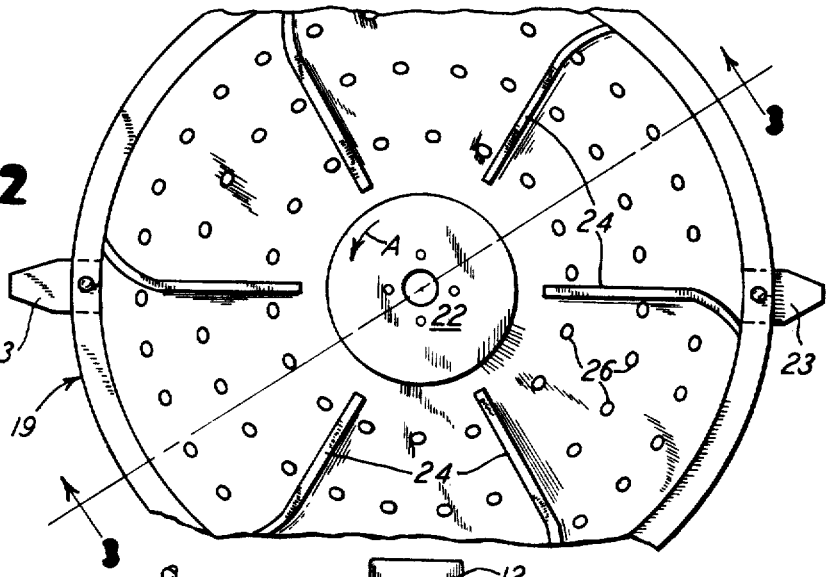
FIG. 2 is a top plan view of the cutter member and fan blades shown in FIG. 1, and with the opposite edges thereof broken away.

The drawings show a rotary type lawn mower, and the prime mover, of a motor or engine designated 10, is shown mounted above a mower housing designated 11. A starter 12 is shown mounted on the engine 10 so that if the latter is a gasoline engine then the starter 12 may be of any conventional design. The mower housing 11 has the upper portion 13 having air-inlet openings therein, such as the air-inlet opening 14. The housing 11 also has the intermediate portion 16 and the lower end skirt portion 17 which terminates in the lower edge 18. The housing 11 is therefore circularly shaped as it extends endlessly around as indicated in the drawing.

A cutter means generally designated 19 is mounted on the engine shaft 21 which extends from the engine 10 into the housing 11. The means 19 consists of a cutter bar or disc 22 and the grass cutting blades 23 which are attached to the outer edge or circumference of the disc 22.

The cutter member 19 also has air-blowing blades 24 mounted thereon, and it will further *be* noted that the member 19 is spaced below and within the outline of the housing 11, and the air-blowing blades 24 are disposed within the space therebetween. Also, the blades 24 are shown to be of the type having a backward curve so that, upon rotation of the cutter member 19 in the direction of the arrow A, the blades will induce the air to flow radially outwardly to a maximum extent for creating air pressure against the housing 11 and thereby air-support the mower. Thus, the housing portion 16 is disposed oblique to the shaft 21 and is flared outwardly in the downward direction and is horizontally spaced from the air-blowing blades 24 for baffling the air downwardly. Still further, the grass-cutting blades 23 are flat plates and are disposed tilted on the disc 22 to be pitched in the direction shown in FIG. 1, and as shown in U.S. Patent 2,737,772, so that, upon rotation, the blades 23 also create an air flow, and this flow is upwardly so that the grass being cut by the blades 23 will not be forced downwardly, but instead the grass may actually be lifted by the upward flow of air immediately adjacent the grass-cutting blades 23.

Figure 3:
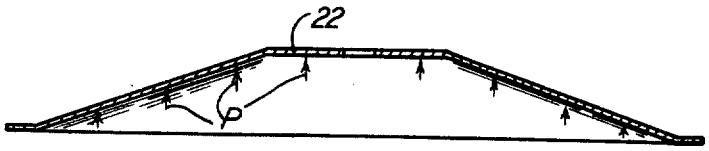
FIG. 3 is a sectional view taken on the line 3—3 of FIG. 2.

The disc 22 is perforate in that it has the plurality of holes 26 extending therethrough so that the air can actually pass through the holes 26 to the under surface of the disc 22. FIG. 3 shows that the air will be pressurized below the disc 22, and air pressure arrows indicated P are shown below the disc 22 and this pressure will support the disc 22 and therefore the entire mower off the ground. Since the disc 22 is disposed below the housing 11, the smaller space is provided between the ground and the disc 22 than that which would exist between the ground and the mower housing 11 for supporting the mower.

The quantity of holes 26 in the disc 22 is less than half of the total surface area of the disc 22, and thus while the air will pass from above the disc to below the disc through the holes 26, it will also be effective in supporting the disc upwardly as mentioned.

A shroud 27 is disposed over the housing 11 and is spaced therefrom and is supported on the housing by means of struts 28. The shroud 27 has a lower edge 29 spaced from the housing skirt 17 to intercept the air flowing out of the housing as indicated by the arrows designated E. The shroud 27 therefore captures the air which would otherwise escape from the mower, and it directs the air upwardly to the air-inlet opening 14 in the housing 11. The shroud 27 also has its upper end 31 disposed over the housing 11, and it has an opening 32 which is disposed adjacent the opening 14 in the housing 11. The shroud therefore extends from the housing skirt 17 to the housing inlet 14 to direct the air over the housing and into the opening 14 as indicated by the arrows shown in FIG. 1. A mower handle 33 is shown pivotally attached to the mower by means of the pin 34 mounted on blocks 36 on the shroud 27. Thus the mower can of course be completely guided by the handle 33 which is only fragmentarily shown but would of course extend up to a hand grip portion for complete control by the operator.

It will therefore be noted that the housing lower edge 18 is disposed at a level above the shroud lower edge 29 so that the escaping air indicated by the arrows will be intercepted by the shroud 27 and directed to the inlet opening 14 and therefore the incoming air into the housing 11 is somewhat pressurized and thus the mower is more efficient or requires less power for creating the air pressure to air-support the entire mower. This of course permits the air-blowing blades 24 to be mounted directly on the cutter member 19 and thus no separate air blower need be provided, if that be desired.

With the recirculation of the air described and effected by means of the shroud or baffle 27, the entire mower may be more effectively raised and raised higher off the ground than it is otherwise possible to raise the mower. Also, the shroud lower edge 29 is shown to be turned up so that it serves as a skid for sliding movement of the entire mower when the mower is not air-supported.

Figure 1:
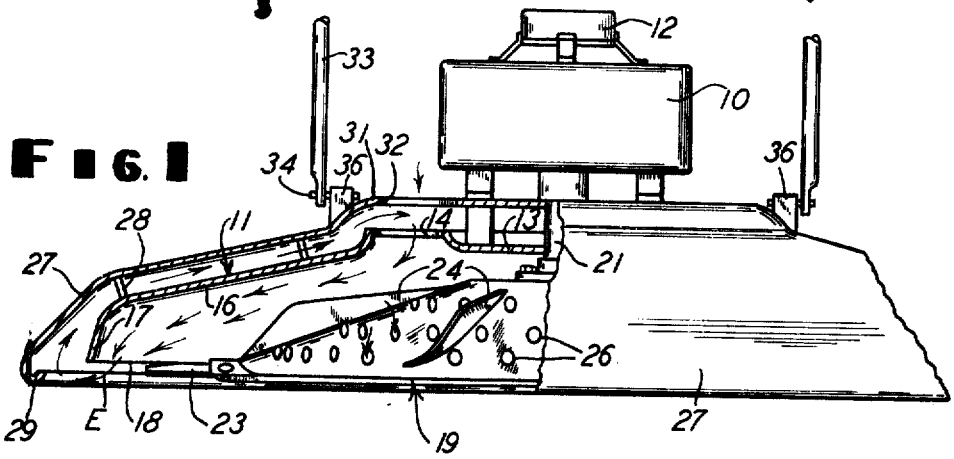
FIG. 1 is a front elevational view of a preferred embodiment of this invention with parts thereof broken away.

The arrows shown in FIG. 1 show the flow of air through the shroud inlet 32 and the housing inlet 14 and along the interior of the housing 11. This air of course exerts a pressure upwardly on the housing as well as on the disc 22 as indicated in FIG. 3 and thus the mower is air-supported.

While a specific embodiment of this invention has been shown and described, it should be obvious that certain changes could be made in the embodiment and the invention should therefore be determined only by the scope of the appended claims.

What is claimed is:

1. An air-supported lawn mower comprising a wheelless housing having a skirt extending around the lower edge thereof and having an air-inlet opening in the upper portion thereof, a motor disposed above said housing and including a rotatable shaft extending therethrough, a grass cutter mounted on said shaft and including grass-cutting blades, air-blowing blades mounted on said grass cutter and disposed above said grass-cutting blades and being oriented toward said skirt for blowing air toward said skirt and air-supporting said mower off the ground, and a shroud mounted on said mower and extending over said housing and being spaced thereabove and with said shroud extending from adjacent said skirt to adjacent said air-inlet opening for receiving air passing said skirt and directing it to said air-inlet opening.

2. An air-supported lawn mower comprising a wheelless housing having a skirt extending around the lower edge thereof and having an air-inlet opening in the upper portion thereof, a motor disposed above said housing and including a rotatable shaft extending therethrough, a disc mounted on said shaft and disposed inside said housing and including grass-cutting blades extending from the circumference of said disc, air-blowing blades mounted on said disc and dispersed thereabove and being oriented toward said skirt for blowing air toward said skirt and air-supporting said mower off the ground, and a shroud mounted on said mower and extending over said housing and being spaced thereabove and with said shroud extending from adjacent said skirt to adjacent said air-inlet opening for receiving air passing said skirt and directing it to said air-inlet opening.

3. An air-supported lawn mower comprising a wheelless housing having an open bottom, a motor disposed above said housing and including a rotatable shaft extending therethrough, a circular disc mounted on said shaft and disposed spaced below said housing, grass cutting blades attached to the circumference of said disc, air-blowing blades mounted on said disc in the space between said housing and said disc and disposed above said grass-cutting blades and being oriented for blowing air toward said housing and air-supporting said mower off the ground, said housing including an intermediate portion obliquely disposed with respect to said shaft and horizontally spaced from said air-blowing blades and oriented to baffle the air blown by said air-blowing blades toward said open bottom.

4. An air-supported lawn mower comprising a wheelless housing, a motor disposed above said housing and including a rotatable shaft extending therethrough, a perforate disc mounted on said shaft and disposed spaced below said housing and including grass-cutting blades, said disc being perforate to have a total air passageway less than one-half the remaining imperforate solid portion of said disc for the passage of air through said disc, and air-blowing blades mounted on said disc in the space between said housing and said disc and disposed above said grass-cutting blades and being oriented for blowing air toward said housing and air-supporting said mower off the ground.

5. An air-supported lawn mower comprising a wheelless housing having a skirt extending around the lower edge thereof and having an air-inlet opening in the upper portion thereof and an open bottom, a motor disposed above said housing and including a rotatable shaft extending therethrough, said housing having a portion intermediate said air-inlet opening and said skirt and disposed oblique to said shaft to be flared outwardly in the downward direction, a grass cutter mounted on said shaft and disposed inside said housing and including grass-cutting blades extending from the edge of said grass cutter and disposed adjacent said skirt and with said grass-cutting blades being pitched upwardly to create an upper air flow adjacent said skirt, and air-blowing blades mounted on said grass cutter and disposed thereabove and being oriented toward said housing intermediate portion for blowing air toward said housing intermediate portion and air-supporting said mower off the ground.

6. An air-supported lawn mower comprising a wheelless housing having a skirt extending around the lower edge thereof and having an air-inlet opening in the upper portion thereof, a motor disposed above said housing and including a rotatable shaft extending therethrough, a grass cutter mounted on said shaft and disposed inside said housing and including grass-cutting blades disposed adjacent said skirt, air-blowing blades operatively connected to said shaft and being oriented toward said housing for blowing air toward said housing and air-supporting said mower off the ground, and a shroud mounted on said mower and extending over said housing and being spaced thereabove and with said shroud extending upwardly from a level below the level of said skirt to adjacent said air-inlet opening for receiving air passing said skirt and directing it into said air-inlet opening.

7. An air-supported lawn mower comprising a wheelless housing having a skirt extending around the lower edge thereof and having an air-inlet opening in the upper portion thereof, a motor disposed above said housing and including a rotatable shaft extending therethrough, a grass cutter mounted on said shaft and disposed inside said housing and including grass-cutting blades, air-blowing blades operatively connected to said shaft and being oriented toward said housing for blowing air toward said housing and air-supporting said mower off the ground, and a shroud mounted on said mower and extending over said housing and being spaced thereabove and with said shroud extending from adjacent said skirt to adjacent said air-inlet opening for receiving air passing said skirt and directing it into said air-inlet opening.

*8. An air-supported lawn mower comprising a wheelless housing having an open bottom, a motor disposed above said housing and including a rotatable shaft extending through an aperture therein, a circular disc mounted on said shaft and disposed spaced below said housing, grass-cutting blades operatively connected with said shaft for rotation with said shaft, air-blowing blades mounted on said disc in the space between said housing and said disc and disposed above said grass-cutting blades and being oriented toward and exposed to a portion of said housing for blowing air onto said housing portion and air-supporting said mower off the ground, said housing portion being located intermediate said open bottom and said aperture and being obliquely disposed with respect to said shaft and horizontally spaced and located from said air-blowing blades along a horizontal plane*

*and oriented to baffle the air blown by said air-blowing blades toward said open bottom.*

References Cited

The following references, cited by the Examiner, are of record in the patented file of this patent or the original patent.

UNITED STATES PATENTS

| | | | |
|---|---|---|---|
| 2,953,888 | 9/1960 | Phillips et al. | 56—295 X |
| 2,975,579 | 3/1961 | Balkus et al. | 56—25.4 |
| 3,110,996 | 11/1963 | Dahlman | 56—25.4 |
| 3,118,513 | 1/1964 | Cockerell | 180—7 |
| 3,170,276 | 2/1965 | Hall | 56—25.4 |
| 3,186,151 | 6/1965 | Hanson | 56—25.4 |
| 3,203,498 | 8/1965 | Cockerell | 180—7 |
| 3,110,996 | 11/1963 | Dahlman | 56—25.4 |
| 3,293,836 | 12/1966 | Heth | 56—25.4 |
| 3,338,038 | 8/1967 | Camph | 56—25.4 |

ANTONIO F. GUIDA, Primary Examiner